Feb. 10, 1942.　　　C. R. McCULLOUGH　　　2,272,414
PRODUCTION OF ACIDS OF PHOSPHORUS
Filed Feb. 10, 1939　　　2 Sheets—Sheet 1
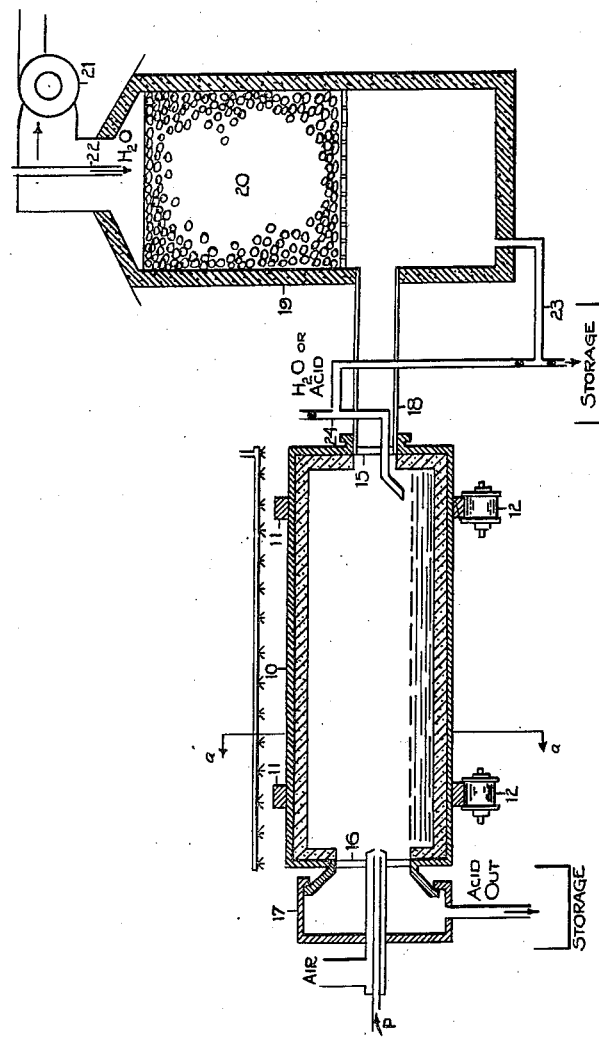
FIGURE I
INVENTOR
C. R. McCullough
BY
Herbert J Krase.
ATTORNEY Feb. 10, 1942.  C. R. McCULLOUGH  2,272,414
PRODUCTION OF ACIDS OF PHOSPHORUS
Filed Feb. 10, 1939  2 Sheets-Sheet 2
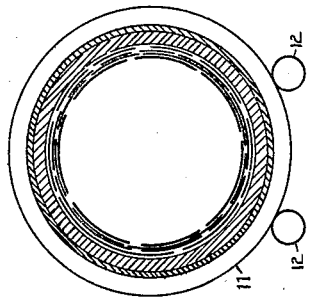
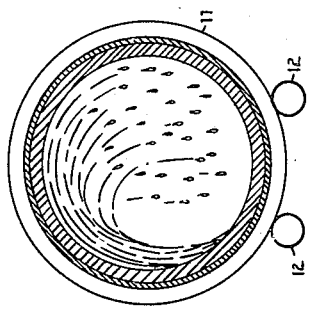
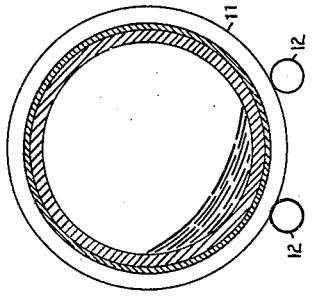
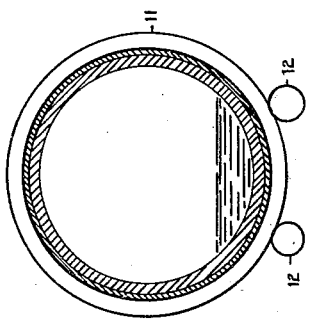
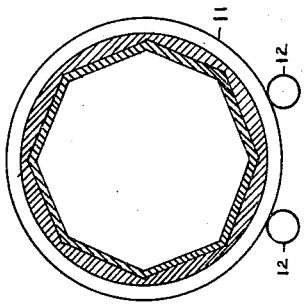
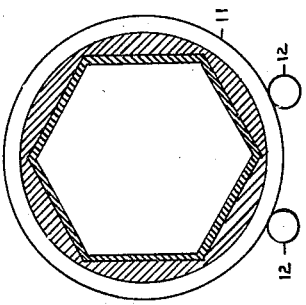
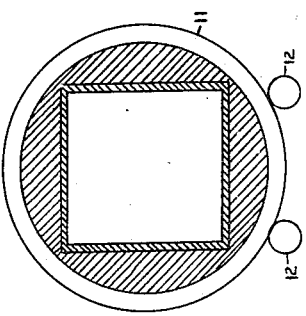
INVENTOR
C. R. McCULLOUGH
BY
ATTORNEY Patented Feb. 10, 1942

2,272,414

UNITED STATES PATENT OFFICE 2,272,414

PRODUCTION OF ACIDS OF PHOSPHORUS

Campbell Rogers McCullough, Anniston, Ala., assignor to Monsanto Chemical Company, a corporation of Delaware Application February 10, 1939, Serial No. 255,574

7 Claims. (Cl. 23—165)

The present invention relates to a method and apparatus for the production of phosphoric acid in which phosphorus is oxidized and the oxidation products thereof are combined with water to produce the acids of phosphorus. According to the invention I may produce either the acids which are hydration products of the pentoxide such as ortho, meta or pyrophosphoric acid, or I may produce acids of the lower oxides of phosphorus.

An object of the present invention is to provide a method and apparatus by which the heat generated by the combustion of phosphorus is readily dissipated and the collection of acids of phosphorus therefore considerably simplified.

A further object of this invention is to provide a method and apparatus by which the heat absorbing surfaces of phosphorus burning chambers may be greatly augmented.

My invention will be described by reference to the drawings illustrating methods and apparatus by which my invention may be practiced.

In the drawings Figure I shows a rotary burning chamber 10 rotatably supported upon tires 11 and rollers 12.

The furnace is equipped with end plates 13 and 14, each provided with central openings 15 and 16. Admission and outlet headers 17 and 18 are provided adjacent the openings 16 and 15. Outlet header 18 connects with mist filter 19 in which is supported a layer of fine coke or other packing material 20 suitable for filtering out the phosphoric acid mist. Suction is applied to the mist filter 19 by means of fan 21. A supply of water 22 may be applied to the top of the filter bed 20 serving to dilute acid collected upon the filtering surfaces. Acid collected in filter 19 flows out by means of pipe 23 and may be used as collected. The concentration of acid collected in tower 19 may vary from 50% $P_2O_5$ to 85% $P_2O_5$.

In operation yellow phosphorus and air are introduced into one end of the furnace for example by means of header 17 adjacent opening 16. Water may be introduced into the furnace at the opposite end, for example through the conduit 18 by means of pipe 24. Combustion of the phosphorus takes place with the air supplied forming phosphorus pentoxide. Some hydration of the anhydride occurs due to water vapor in the combustion air.

Combustion may also be effected exteriorly of the rotary furnace, for example in a stationary furnace and the hot gases and vapors resulting therefrom may be led into the rotary furnace for further reaction as described.

Depending upon the temperature and concentration of acid maintained in the rotating furnace absorption of the anhydride or hydration products will depend upon the temperature of the acid film or layer maintained in the rotating furnace. The temperature and the concentration of the acid will determine the relative vapor pressure of the phosphorus oxidation and hydration products over the liquid acid. Should the vapor pressure of the liquid acid exceed the partial pressure of these compounds in the gas phase no absorption can occur and evaporation of the liquid acid will take place. When the concentration of the oxidation products in the gas phase exceeds the partial pressure of these products over the liquid acid, absorption takes place and the volume of liquid acid in the furnace increases. The volume of acid in the furnace will increase so that acid may flow out of the opening 16. The acid thus produced may have a $P_2O_5$ concentration exceeding meta phosphoric acid in concentration, i. e., 89% $P_2O_5$ and even higher. Such high $P_2O_5$ acids may be solid at ordinary temperature. Because of the high temperatures available due to the combustion of phosphorus such strong viscous acids may be made to flow freely and no trouble is encountered in the continuous removal of such acids from the furnace.

The vapor pressure of the liquid acid in the rotary furnace may be controlled by varying the acid temperature within the furnace. This is most easily accomplished by the application of a cooling fluid such as water upon the outer shell of the furnace. Water thus freely sprayed upon the rotating drum cools the metal thereof, so that the adjacent layers of acid in the interior of the drum are cooled to the point where such acid is no longer corrosive to the metal wall thereof and which may be solid at the acid-metal interface. This lack of corrosion is in part due to the high viscosity of the strong acid in part due to temperature gradient through said layers of acid. By virtue of the temperature gradient in the acid film it is possible to maintain in the interior of the furnace the high temperatures resulting from the combustion of phosphorus in a combined space.

However, in spite of the high temperature gradient existing in the film of acid upon the interior of the furnace walls, I am able to obtain a heat transfer of from 50% to 90% of the total heat generated from the burning phosphorus to the cooling fluid upon the furnace exterior.

For the purpose of producing acid salts of phosphorus I may introduce various salts or oxides into the furnace. Salts of sodium or potassium such as the chloride, carbonate, sulfate or the corresponding calcium salts or oxide may be introduced into the furnace at the time the lining is formed. Such salts will react with the acid formed, and the reaction product may be made to correspond to a combination of the base with an excess of the anhydride. Examples of such combinations are forms of metaphosphoric acid solid at ordinary temperature because of the minor proportion of the base combined therewith.

Again I may exert a further control of the furnace temperature, concentration of acid and degree of absorption by varying the speed of the rotary furnace. Figures II to V illustrate the effect of increasing the speed of a cylindrical furnace upon the behavior of the fluid content of the furnace. Figure II shows a condition resulting from what I term slow speed operation, and indicates a fairly quiet pool of liquid acid with a substantially horizontal surface.

Figure III, showing conditions obtaining in the furnace at a somewhat faster rate of turning and indicates that the pool of acid is being carried up the side of the furnace by the increased speed of the wall.

Figure IV shows conditions existing in the furnace at a still higher speed of revolution than that of Figure III. In this condition the fluid acid in the furnace leaves the wall before the highest point is reached and falls freely through the furnace interior. This condition resembles "rain" in that the atmosphere within the furnace is filled with droplets and streams of liquid acid. I shall refer to this condition herein as the condition of "rain." When this condition exists an enormously greater surface of liquid acid is presented to the gases and vapors of the furnace atmosphere. This largely increased surface greatly increases the absorption of heat and also phosphorus anhydride and hydration products thereof by the liquid acid. For example the absorption of anhydride may increase from say 50 to 60% of the phosphorus burned to 90 or 95% of that burned. The absorption of heat by the liquid acid is also correspondingly increased.

Figure V shows the condition existing in the furnace at a still higher speed than is illustrated in Figure IV. Under the conditions illustrated by Figure V the furnace is turning at what I term high speed. Under these conditions the liquid acid within the furnace is maintained as a continuous film upon the furnace wall by centrifugal force, and the atmosphere is relatively free of the droplets encountered in the condition shown by Figure IV. Since however, all of the acid in the drum is uniformly distributed over the walls of the furnace, the acid film is generally much thicker than it is in any of the other conditions illustrated, and consequently has the greatest insulating value. For high temperature work, that is, where it is desired to conserve heat within the furnace, this condition is preferred.

Since the conditions illustrated by the diagrams, Figures II to V, are dependent upon the viscosity of the liquid prevailing in the drum as well as the drum diameter and further since the viscosity is dependent upon anhydride concentration as well as temperature, it is impossible to numerically state the speed at which the various phenomena occur. However, the conditions illustrated, follow each other in the order stated when the drum speed is increased so that it is a simple matter to find the particular conditions desired for any purpose.

While it is possible to obtain the condition described as "rain" in a cylindrical drum, a more satisfactory method of producing such condition is to operate with a non-cylindrical drum, that is one which has a square, pentagonal, hexagonal, or octagonal cross-section. In such a case the solid or liquid lining assumes the configuration of the shell and materially assists in the formation of rain. A suitable drum may have from four to 12 sides and will approximate a right prism horizontally mounted to rotate about its long axis.

Figures VI to VIII inclusive illustrate section views of non-cylindrical furnace having respectively four, six and eight sides although other types may be used. Drums having non-cylindrical sections such as those illustrated may advantageously be employed for phosphorus combustion and acid absorption furnaces.

The strong phosphoric acids produced by my process, are ordinarily, with the exception of ortho and pyrophosphoric acid, not crystalline bodies. This is particularly true of tetraphosphoric acid, $H_6P_4O_{13}$ and metaphosphoric acid, $HPO_3$, which therefore do not have sharp melting points. I have, however, used the term "melting point" in this application even though the phenomena upon heating is more accurately described as a softening or decreased viscosity effect.

What I claim is:

1. The method of producing acids of phosphorus which comprises providing a layer of acid upon the interior of the metallic shell of a rotating drum furnace, supplying to said furnace water together with hot combustion products resulting from the reaction of phosphorus with air, simultaneously applying a cooling fluid to the exterior of said furnace shell and thereby cooling the acid in contact with said shell, said combustion products of phosphorus having a concentration of reaction products exceeding the partial pressure of said reaction products over said acid, and withdrawing said acid from said furnace.

2. The method of producing a phosphoric acid having a concentration within the range of 50% $P_2O_5$ to 89% $P_2O_5$ which comprises providing a layer of the said acid upon the interior of the metallic shell of a rotating drum furnace, supplying to the interior of said furnace water, together with hot combustion products produced by the oxidation of phosphorus, simultaneously applying a cooling fluid to the exterior of said metallic furnace shell thereby cooling the acid in contact with said shell interiorly thereof said oxidation products having a $P_2O_5$ concentration exceeding the partial pressure of said $P_2O_5$ over said acid, and withdrawing said acid from said furnace.

3. The method of producing a phosphoric acid having a concentration ranging upwardly to that of metaphosphoric acid which comprises providing a layer of said acid upon the interior of the metallic shell of a rotating drum furnace and in contact therewith, establishing a high temperature combustion zone in the interior of said furnace by the combustion of phosphorus and air therein, supplying water to said combustion zone in amount to react with the products resulting from said combustion of phosphorus and applying cooling water upon the exterior of said shell and thereby cooling the acid in contact with said shell interiorly thereof, said oxidation products having a $P_2O_5$ concentration exceeding the partial pressure of said $P_2O_5$ over said acid, and withdrawing said acid from said furnace shell.

4. The method of producing phosphoric acids of concentration ranging upwardly in $P_2O_5$ concentration to those acids which are solid at ordinary temperatures, comprising providing a layer of phosphoric acid upon the interior of the metallic shell of a rotating drum furnace and in contact therewith, establishing a high temperature combustion zone in the interior of said drum, by the combustion of phosphorus therein, supplying water to said combustion zone in amount to react with the products resulting from said combustion of phosphorus and applying cooling water upon the exterior of said drum, and thereby cooling the acid in contact with said drum interiorly thereof, said oxidation products having a $P_2O_5$ concentration exceeding the partial pressure of said $P_2O_5$ over said acid, and withdrawing said acid from said drum.

5. The method of producing a phosphoric acid having a concentration ranging upwardly to that of metaphosphoric acid which comprises providing a layer of said acid upon the interior of the metallic shell of a rotating drum furnace and in contact with said shell, establishing a high temperature combustion zone in the interior of said furnace by the combustion of phosphorus therein, supplying water to said combustion zone in amount to react with the products resulting from said combustion of phosphorus, applying cooling water upon the exterior of said shell and thereby cooling the acid in contact with said shell interiorly thereof while rotating said furnace at a rate to produce "rain" in said furnace interior.

6. The method of producing phosphoric acid approximating metaphosphoric acid in concentration which comprises providing a layer of said acid upon the interior of the metallic shell of a rotating drum furnace and in contact with said shell, establishing a high temperature combustion zone in the interior of said furnace by the combustion of phosphorus, supplying water to said combustion zone in amount to react with the products resulting from said combustion of phosphorus, and to produce said acid, applying a cooling fluid upon the exterior of said shell and thereby cooling the acid in contact with said shell interiorly thereof, while rotating said furnace at a rate less than that necessary to produce a centrifugal lining of said acid on said furnace shell but sufficient to produce therein a condition of "rain" of said acid in said furnace.

7. The method of producing phosphoric acids of concentration ranging upwardly in $P_2O_5$ concentration from that of metaphosphoric acid to those acids which are solid at ordinary temperature, comprising producing a layer of phosphoric acid upon the interior of the metallic shell of a rotating drum furnace and in contact therewith, establishing an incandescent combustion zone in the interior of said drum, by the combustion of phosphorus therein, supplying water to said combustion zone in amount to react with the products resulting from said combustion, and applying cooling water upon the exterior of said drum and thereby cooling the acid in contact therewith interiorly thereof, said oxidation products having a $P_2O_5$ concentration exceeding the partial pressure of said $P_2O_5$ over said acid while rotating said furnace at a rate less than that necessary to produce a centrifugal lining of said acid on said furnace shell but sufficient to produce therein a condition of "rain" of said acid in said furnace.

CAMPBELL ROGERS McCULLOUGH.